(12) United States Patent
Casado Magaña et al.

(10) Patent No.: US 10,063,588 B2
(45) Date of Patent: Aug. 28, 2018

(54) DEVICE AND METHOD FOR TRANSFERRING FILES FROM A PORTABLE STORAGE DEVICE

(71) Applicant: The Boeing Company, Chicago, IL (US)

(72) Inventors: Enrique Juan Casado Magaña, Madrid (ES); David Esteban-Campillo, Madrid (ES); David Scarlatti, Madrid (ES)

(73) Assignee: The Boeing Company, Chicago, IL (US)

( * ) Notice: Subject to any disclaimer, the term of this patent is extended or adjusted under 35 U.S.C. 154(b) by 144 days.

(21) Appl. No.: 15/075,113

(22) Filed: Mar. 19, 2016

(65) Prior Publication Data
US 2016/0301711 A1    Oct. 13, 2016

(30) Foreign Application Priority Data

Apr. 9, 2015  (EP) .................................... 15382172

(51) Int. Cl.
| | | |
|---|---|---|
| *H04L 29/06* | (2006.01) | |
| *H04L 29/08* | (2006.01) | |
| *G06F 21/62* | (2013.01) | |
| *H04L 12/24* | (2006.01) | |

(52) U.S. Cl.
CPC ...... *H04L 63/1441* (2013.01); *G06F 21/6218* (2013.01); *H04L 41/0803* (2013.01); *H04L 63/0227* (2013.01); *H04L 67/06* (2013.01)

(58) Field of Classification Search
CPC ............. H04L 63/1441; H04L 63/0227; H04L 41/0803; H04L 67/06; G06F 21/6218
See application file for complete search history.

(56) References Cited

U.S. PATENT DOCUMENTS

| | | | |
|---|---|---|---|
| 2004/0059943 A1* | 3/2004 | Marquet | H04L 63/0218 726/13 |
| 2005/0015599 A1* | 1/2005 | Wang | G06F 21/562 713/176 |
| 2012/0240234 A1 | 9/2012 | Lomont et al. | |
| 2014/0337558 A1 | 11/2014 | Powers et al. | |
| 2016/0012270 A1* | 1/2016 | Xu | G06K 9/00885 382/115 |

OTHER PUBLICATIONS

Extended European Search Report issued in European Patent Application No. 15382172.3 dated Oct. 9, 2015.

* cited by examiner

*Primary Examiner* — Izunna Okeke
*Assistant Examiner* — Cheng-Feng Huang
(74) *Attorney, Agent, or Firm* — McDonnell Boehnen Hulbert & Berghoff LLP

(57) ABSTRACT

The invention proposes a new device and method that allows scanning and downloading the content of a portable storage device (i.e., USB drive) from any computer with a portable storage device plug and a browser without the risk of having the computer infected by virus or malware resident in the portable storage device. The device can be manufactured in a small and portable device.

11 Claims, 2 Drawing Sheets

DEVICE AND METHOD FOR TRANSFERRING FILES FROM A PORTABLE STORAGE DEVICE

CROSS REFERENCE TO RELATED APPLICATIONS

The present application claims the benefit of European Patent Application No. 15382172.3 filed Apr. 9, 2015 the entire contents of which are incorporated entirely herein by reference.

BACKGROUND OF THE INVENTION

USB drives, like any other portable storage device, are commonplace and a practical way to interchange files between computers. However, a portable USB storage device can host viruses and malware, and the way common operating systems manage the USB drive may allow the malware to infect the computers.

Today many organizations forbid the use of USB drives or even remove or block the USB port from the computers. Other solutions offer an independent computer using an air gap philosophy for reading USBs. These approaches may not be practical (does not solve the problem of moving big files), or secure enough (depends on the end users following policies and norms).

SUMMARY OF THE INVENTION

A first aspect of the present invention is to provide a security device for transferring files from a portable storage device. The device of the present invention is placed between the computer system intended to be protected and the portable storage device. The portable storage device may contain files that host viruses and other malware that may infect the computer system. The security device analyzes the files, identifies files as safe, and filters the files in a manner without interacting directly with the computer system's operating system. The security device of the present invention can be implemented as a part of the computer system or as a small form factor housing.

In one embodiment, the present invention provides a security device for transferring files from a portable storage device. The security device includes: a first interface for connecting to a computing system; a second interface for receiving a portable storage device; a processor module connected to the first interface and the second interface; and, a first-interface to Ethernet adapter connected to the first interface and to the processor module. Thus, the first-interface to Ethernet adapter is placed between the first interface and the processor module. The processor module is configured to create a virtual network at the first interface when the security device is coupled to a computing system. The processor module also is configured to filter files received at the second interface from the portable storage device and send filtered files to the computing system via the virtual network.

In one or more embodiments, the processor module may further include an Ethernet module for creating the virtual network at the first interface when the security device is coupled to a computing system. The processor module may further include a file analysis module for filtering files received at the second interface from the portable storage device. The processor module may further include a server for sending said filtered files to the computing system via said virtual network.

In one or more embodiments, the security device may further include a local database for storing security data. The security data may include anti-virus data, malware signatures, and the like. The processor module may be further configured to filter the files using the local database.

In one or more embodiments, the security device may further include a wireless communication module. The processor module may be configured to access security data (e.g., anti-virus data, malware signatures, and the like) stored remotely from the security device. The processor module accesses the security data via the wireless communication module. The processor module may be configured to use the remotely stored security data to filter the files.

In one or more embodiments, the security device may include a micro-firewall connected to the first-interface to Ethernet adaptor. The processor module may be further configured to send the filtered files to the computing system through the micro-firewall.

In one or more embodiments, the security device may include a first memory in which a read-only filesystem is mounted. The first memory is connected to the second interface. The processing module may be configured to receive files from the portable storage device at the second interface and filter files in read-only mode.

In one or more embodiments, the processor module is a microcomputer with a read-only operating system stored in a second memory.

In one or more embodiments, the first interface is a USB plug for connecting to a USB host in the computing system. The second interface may be a USB plug for receiving a USB-portable storage device. Advantageously, the security device may include a small form factor housing so that at least the first interface, the second interface, the processor module, and the first-interface to Ethernet adapter are disposed within or at the housing.

In one or more embodiments, the processor module may be configured to identify files as safe based on the security data. The processor module filters the files by providing only the safe files to the server connected to the virtual network. The processor module may be further configured to provide a link to download filtered files identified as safe by means of a web page from the server. The processor module may be further configured to provide a list of files not identified as safe by means of a web page from the server. With the above configuration of the security device, the content of the portable storage device cannot directly interact with the operating system of the computer system. Therefore, the user of the computer system can "download-from-the-PortableStorageDevice" instead of "access-to-the-PortableStorageDevice".

In a second aspect of the present invention, a method is provided for securely transferring files from a portable storage device. The method includes: creating a virtual network at a first interface of a security device. The first interface is connected to a computing system comprising a network host. The method further includes filtering files received from the portable storage device in read-only mode at a second interface of the security device, and sending files filtered in a read-only mode, by means of a server at the security device to the computing system via the virtual network.

In one or more embodiments, the method may include adapting the security device at the first interface for the computing system network host using a first-interface to Ethernet adapter.

In one or more embodiments, the method may include mounting a file system in read-only mode.

In one or more embodiments, the method may include filtering the files using security data such as anti-virus data or malware signatures, either locally stored on the security device or remotely accessed via a wireless communication module of the security device.

In one or more embodiments, the method may include identifying files as safe and providing the safe filtered files to a server local to the security device. The method may further include providing a link to download filtered files identified as safe filtered files by means of a web page from the server. The method may further include providing a list of filtered files not considered safe by means of the web page.

In one or more embodiments, the method may include use of the security device according to any of the described embodiments of the security device.

A third aspect of the present invention is to provide a computer readable medium having stored therein a computer program, that when loaded onto a processor module of the security device, configures the security device according to any of the described embodiments of the security device.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will be best understood by reference to the following detailed description of an illustrative embodiment of the present disclosure when read in conjunction with the accompanying drawings, wherein:

DETAILED DESCRIPTION

The present disclosure provides a security device and method for transferring files from a portable storage device (i.e. thumb drive) into a computer in a safe mode. The security device and method creates a "microserver" that presents the content of the portable storage device to the computer without interacting directly with the computer Operating System (OS). For example, a user of the computer can safely download from the portable storage device rather than allowing the portable storage device to potentially access the computer operating system. Furthermore, any kind of secure policies and tools can be reinforced and hosted in the security device of the present invention itself. Alternatively or in combination with, the security device may access an online security service to scan the portable storage device with fresh signatures to detect malware or viruses. The content is analysed prior to be served to the computer.

Figure 1:
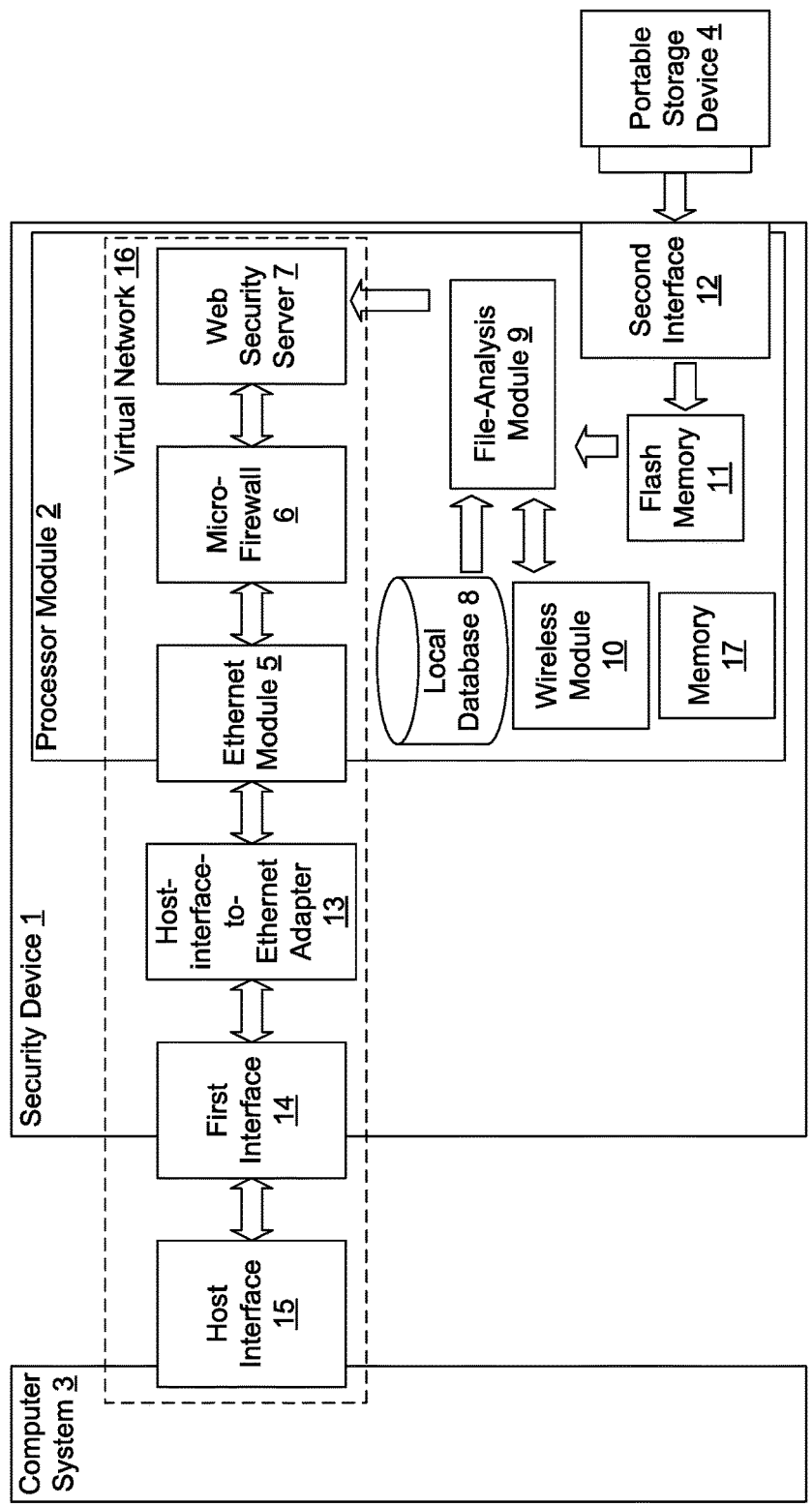
FIG. 1 is a diagram of an embodiment of the security device of the present invention. The security filter device is connected to computer system and to a portable storage device.

An embodiment of the proposed device is shown in FIG. 1. FIG. 1 shows the computer system 3 having its own computer's defense for networking (not shown) and its own USB-host 15, the security device 1 and the Universal Serial Bus (USB)-portable storage device 4. The USB-portable storage device 4 can be a potential source of risks since it can host viruses and malware software. The risk is avoided by placing the security device 1 between the computer system 3 and the USB-portable storage device 4. The security device 1 is configured to activate the computer's defense for networking of the computer system 3 since the computer system 3 interfaces with the security device 1 as a new Ethernet network without any other computer. The security device 1 is configured to interface to the computer system 3 such that the computer system 3 receives data indicative of a server offering a web page.

In detail, FIG. 1 shows a security device 1 that comprises a first interface 14 and a second interface 12, a processing module 2, and a host-interface-to-Ethernet adapter 13.

In various embodiments, first interface 14 may be removably coupled to host interface 15 of the computer system 3. For example, security device 1 may be a small form factor device where first interface 14 is plugged into host interface 15 when a user desires to transfer files from portable storage device 4 to the computer system 3, and first interface 14 is removed thereafter. Alternatively, security device 1 may be a device integrated into computer system 3 such that first interface 14 is connected to host interface 15 and is not removable. In this example, first interface 14 is shown as a USB-plug, and second interface 12 is shown as a USB-host. However, first and second interfaces are not limited to USB and may be any combination of interfaces supporting standard protocols, including and not limited to universal serial bus (USB), firewire (IEEE 1394), high-definition multimedia interface (HDMI), DisplayPort, and portable digital media interface (PDMI).

The processor module 2 may include one or more processing units (e.g., a multi-core configuration). Further, processor module 2 may be implemented using one or more heterogeneous processor systems in which a main processor is present with secondary processors on a single chip. As another illustrative example, processor module 2 may be a symmetric multi-processor system containing multiple processors of the same type. Processor module 2 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. Further, functions and modules described may be implemented in a single processing unit, multiple processing units, hardware, firmware, software executable by a processor, or any suitable combination of.

Referring to the example of FIG. 1, processor module 2 may include Ethernet module 5, micro-firewall 6, web security server 7, local database 8, file-analysis module 9, wireless module 10, flash memory 11 and memory 17. A read-only operating system may be stored in the memory 17 and run on the processor module 2. As previously described, the USB-plug (first interface) 14 is connected to the computing system 3. The USB-host (second interface) 12 is connected to the USB-portable storage device 4. The processor module 2 is connected to USB-plug 14 and to the USB-host 12.

In embodiments where first interface 14 is a USB-plug 14, a USB-to-Ethernet adapter 13 is connected to the USB-plug 14 and to the processor module 2. In other embodiments, first interface 14 may use a different standard protocol (e.g. firewire, HDMI, DisplayPort, PDMI, etc) in which a suitable adapter other than a USB-to-Ethernet may be implemented instead such that an Ethernet interface is presented to processor module 2. In this example, the USB-to-Ethernet adapter 13 is connected to the USB-plug 14 and to Ethernet module 5.

The Ethernet module 5 creates a virtual network 16 at the USB-plug 14/USB-host 15 (because both are physically connected as a plug/socket) when the security device 1 is coupled to the computing system 3. The creation of the virtual network is implemented such that the computing system 3 receives data or signals indicative that a new Ethernet network is detected at first interface 14. Furthermore, the created virtual network 16 triggers the activation of the computer's defense for networking.

The file-analysis module 9 receives files at USB-host 12 from the USB-portable storage device 4. The file-analysis module 9 may access a local database of security data such as anti-virus data and/or malware signatures. Alternatively or in combination with, the file-analysis module 9 may be connected to wireless module 10 to access remotely stored security data to obtain the most current anti-virus data or malware signatures. The wireless module 10 may use any suitable wireless communication protocol including but not limited to WiFi, Bluetooth, IEEE 802, etc. The file-analysis module 9 uses the security data to analyze the files received at USB-host 12. The file-analysis module 9 may further filter the received files by identifying which files are safe and which files are not safe. The file-analysis module 9 may then send the safe filtered files to the web security server 7 which sends the filtered files to the computing system 3 via the virtual network 16.

A micro-firewall 6 may be connected to the Ethernet module 5 and to the web security server 7. As any other firewall, the micro-firewall 6 may control the incoming and outgoing network traffic based on an applied rule set.

In various embodiments, a flash memory 11 may be connected to the USB-host 12 and to the file-analysis module 9. A read-only file system may be mounted on the flash memory 11, thus avoiding the risks for the processor module 2 to be infected by any virus contained in the USB-portable storage device 4. A read-only operating system may be stored in the memory 17 and loaded to run on the processor module 2. This also helps to avoid the risks for the processor module 2 to be infected by any virus contained in the USB-portable storage device 4.

After the filtering, the virtual network will send signals or data such that the computer system 3 sees an HTTPS Server (web security server 7) offering a web page. The web page may contain links to download only the files that have been identified as safe by the security device 1. The download may be done using FTP or other suitable protocol from the web security server 7 to the computer system 3. Suspicious files may be prevented from being downloaded by not providing access to them from the web security server 7. The web page may list the files identified as not safe and the reasons they are considered unsafe. Furthermore, the computer system 3 operating system does not access host interface 15 as seeing a portable storage device 4, but operates to access a virtual network instead.

For the embodiment shown in FIG. 1, the USB-host 15 powers both the security device 1 and the USB-portable storage device 4.

Figure 2:
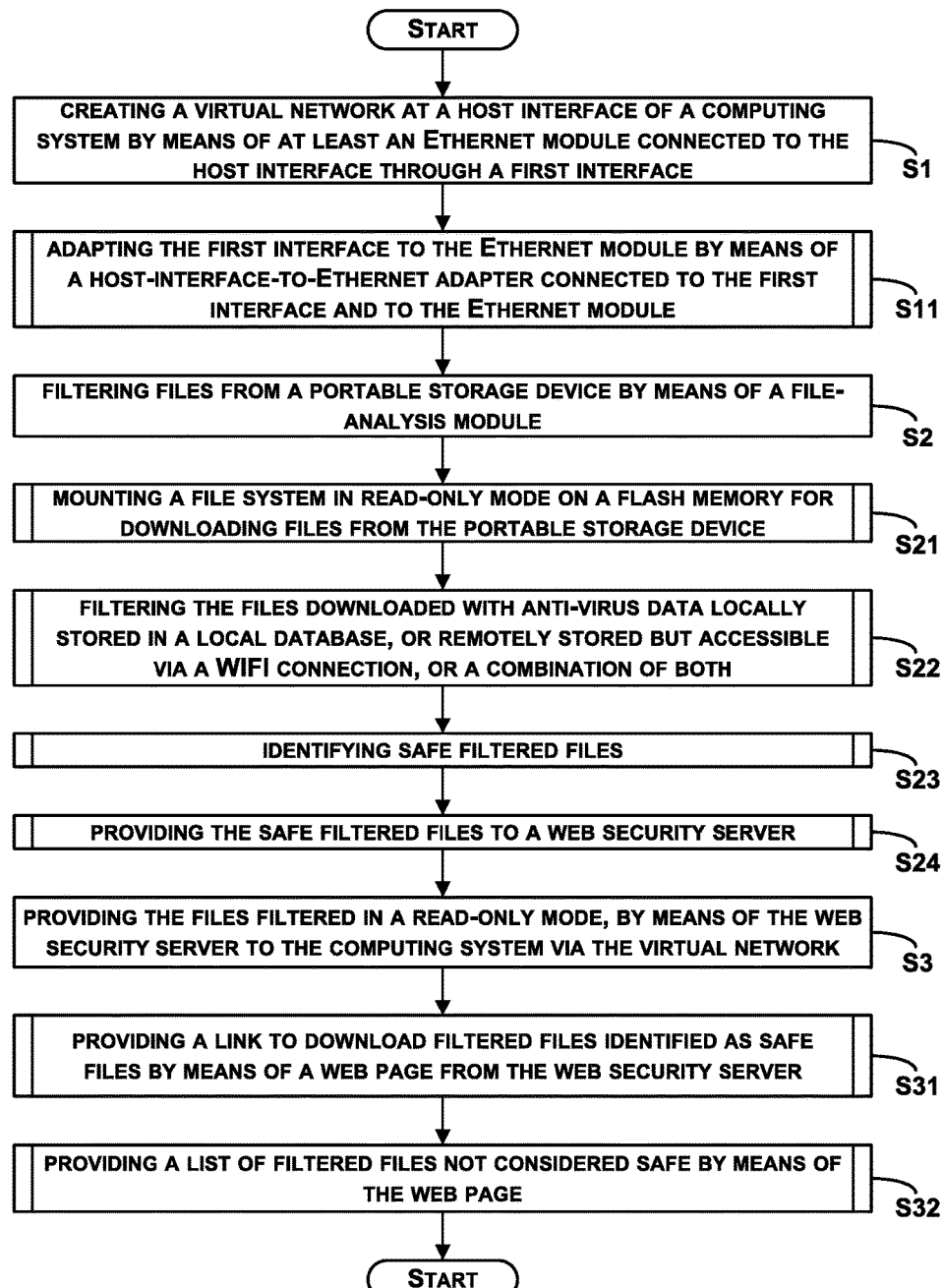
FIG. 2 is a flowchart of a method for transferring files from a portable storage device according to the present invention.

FIG. 2 illustrates an embodiment of a method of the present invention using the embodiment of the proposed device as shown in FIG. 1. The method for transferring files from a portable storage device 4 comprises the following steps:

i) Creating (S1) a virtual network 16 at the USB-host 15 of the computing system 3 by means of at least the Ethernet module 5, which is connected to the USB-host 15 through the USB-plug 14;

Adapting (S11) the USB-plug 14 to the Ethernet module 5 by means of the USB-to-Ethernet adapter 13, which is connected to the USB-plug 14 and to the Ethernet module 5;

ii) Filtering (S2) files from the USB-portable storage device 4 by means of the file-analysis module 9;

Mounting (S21) a file system in read-only mode on the flash memory 11 for downloading files from the USB-portable storage device 4;

Filtering (S22) the files downloaded with anti-virus data locally stored in the local database 8, or remotely stored but accessible via WIFI connection 10, or a combination of both;

Identifying (S23) safe filtered files;

Providing (S24) the safe filtered files to the web security server 7.

iii) Providing (S3) the files filtered in a read-only mode, by means of the web security server 7 to the computing system 3 via the virtual network 16.

Providing (S31) a link to download filtered files identified as safe files by means of a web page from the web security server 7; and, Providing (S32) a list of filtered files not considered safe by means of the web page.

The description of the different advantageous implementations has been presented for purposes of illustration and description, and is not intended to be exhaustive or limited to the implementations in the form disclosed. Many modifications and variations will be apparent to those of ordinary skill in the art. Furthermore, different advantageous implementations may provide different advantages as compared to other advantageous implementations. Other examples are intended to be within the scope of the claims if they have structural elements that do not differ from the literal language of the claims, or if they include equivalent structural elements with unsubstantial differences from the literal language of the claims.

The invention claimed is:

1. A security device for transferring files from a portable storage device, the security device comprising:
   a first interface for connecting to a computing system;
   a second interface for receiving the portable storage device;
   a first memory in which a read-only file system is mounted, wherein the first memory is connected to the second interface;
   a processor module connected to said first interface and said second interface, wherein the processor module includes an Ethernet module and a web security server; and
   a host-interface-to-Ethernet adapter connected to the first interface and to the processor module;
   wherein the processor module is configured to:
      create a virtual network at said first interface by the Ethernet module when said security device is coupled to the computing system, wherein the processor module is configured to communicate with the computing system via the web security server using the virtual network created at the first interface;
      adapt the first interface to the Ethernet module via the host-interface-to-Ethernet adapter;
      download files received at the second interface from the portable storage device in read-only mode via the read-only file system;
      filter downloaded files using anti-virus data that is locally stored in a local database or remotely stored and accessible via a wireless network connection;

identify safe filtered files;
provide the safe filtered files to the web security server;
provide a link to download filtered files identified as safe from the web security server to the computing system via said virtual network by means of a web page: and
provide a list of files not identified as safe by means of the web pace from the web security server.

2. The security device according to claim 1, wherein the processor module further comprises:
a file analysis module for filtering said files received at said second interface.

3. The security device according to claim 1, further comprising a wireless module, and wherein the processor module is further configured to access the anti-virus data via said wireless module and filter files using accessed anti-virus data.

4. The security device according to claim 1, further comprising a micro-firewall connected to the host-interface-to-Ethernet adapter, and wherein the processor module is further configured to send the safe filtered files to the computing system through the micro-firewall.

5. The security device according to claim 1, wherein the processor module is a microcomputer with a read-only operating system stored in a second memory.

6. The security device according to claim 1, wherein the first interface is a USB plug for connecting to a USB host in the computing system.

7. The security device according to claim 1, wherein the second interface is a USB interface for receiving a USB-portable storage device.

8. The security device according to claim 7, further comprising a small form factor housing such that at least the first interface, the second interface, the processor module, and the host-interface-to-Ethernet adapter are disposed within or at said small form factor housing.

9. A method for securely transferring files from a portable storage device comprising:
creating a virtual network at a first interface of a security device by an Ethernet module, wherein the security device is configured to connect to a computing system via the first interface, wherein the security device is configured to create the virtual network at the first interface when the security device is coupled to the computing system, wherein creating the virtual network comprises adapting the first interface to the Ethernet module by a host-interface-to-Ethernet adapter, wherein the security device includes a web security server such that the security device is configured to communicate with the computing system via the web security server using the virtual network created at the first interface, wherein the security device comprises a first memory in which a read-only file system is mounted;
downloading files received at a second interface of the security device, wherein the first memory is connected to the second interface, and wherein downloading the files comprises downloading the files in read-only mode via the read-only file system ;
filtering downloaded files using anti-virus data locally stored in a local database or remotely stored and accessible via a wireless network connection; and
identifying safe filtered files;
providing the safe filtered files in read-only mode via the web security server to the computing system via the virtual network, wherein providing the safe filtered files comprises providing a link to download filtered files identified as safe via a web page from the web security server; and
providing a list of files not identified as safe via the web page from the web security server.

10. The method according to claim 9, wherein the security device comprises a wireless module, and wherein filtering the downloaded files comprises:
accessing the anti-virus data via the wireless module; and
filtering the downloaded files using accessed anti-virus data.

11. The method according to claim 9, wherein the security device comprises a micro-firewall connected to the first interface, and wherein sending files comprises sending filtered files to the computing system through the micro-firewall.

* * * * *